United States Patent [19]

Verraest et al.

[11] Patent Number: 5,777,090
[45] Date of Patent: Jul. 7, 1998

[54] CARBOXYMETHYL INULIN

[75] Inventors: Dorine Lisa Verraest, Boskoop; Jan Gerardus Batelaan, Arnhem; Johannes Andreas Peters, Voorburg; Herman van Bekkum, Vlaardingen, all of Netherlands

[73] Assignee: Akzo Nobel NV, Arnhem, Netherlands

[21] Appl. No.: 663,037

[22] PCT Filed: Dec. 9, 1994

[86] PCT No.: PCT/EP94/04097

§ 371 Date: Jun. 6, 1996

§ 102(e) Date: Jun. 6, 1996

[87] PCT Pub. No.: WO95/15984

PCT Pub. Date: Jun. 15, 1995

[30] Foreign Application Priority Data

Dec. 10, 1993 [NL] Netherlands ............... 9302163

[51] Int. Cl.$^6$ .................. C08B 37/18; C02F 5/10
[52] U.S. Cl. .................. 536/4.1; 536/123.1
[58] Field of Search .................. 536/4.1, 123.1

[56] References Cited

U.S. PATENT DOCUMENTS

| | | |
|---|---|---|
| 3,596,766 | 8/1971 | Johnston et al. .................. 210/58 |
| 3,634,392 | 1/1972 | Lyness et al. |
| 4,986,980 | 1/1991 | Jacobsen .................. 424/9 |
| 5,122,598 | 6/1992 | della Valle et al. .................. 536/20 |

FOREIGN PATENT DOCUMENTS

WO 91/17189  11/1991  WIPO.

OTHER PUBLICATIONS

*Journal of Immunological Methods*, vol. 26, No. 1, 1979, pp. 39–46.
*Chemical Abstracts*, 90/256413/34, JP 2178-229-A, Jul. 11, 1990.
*International Search Report*, PCT/EP94/04097, dated Apr. 4, 1995.

*Primary Examiner*—Nathan M. Nutter
*Attorney, Agent, or Firm*—Ralph J. Mancini; Louis A. Morris

[57] ABSTRACT

Disclosed is carboxymethyl inulin having a degree of substitution (DS) ranging from 0.15 to 2.5, preferably from 0.5 to 1.5, a process for the preparation of said carboxymethyl inulin by reacting inulin at a concentration of at least 100 g/l, preferably at least 200 g/l, at elevated temperature with an aqueous alkaline solution of monochloroacetic acid, followed by working up the reaction mixture according to a method known in the chemical art, and the use of said carboxymethyl inulin as inhibitor for the crystallization of calcium carbonate.

13 Claims, No Drawings

CARBOXYMETHYL INULIN

The invention relates to carboxymethyl inulin and a process for its preparation. Carboxymethyl inulin is known per se from an article of Chien et al in the Journal of Immunological Methods, 1979, 1, 39–46. The product disclosed therein has a degree of substitution (DS) of 0.11. It was prepared by conversion of inulin (74 mmoles monosaccharide units) with 450 mmoles sodium chloroacetate in 90 ml 10N NaOH. Accordingly, the efficiency of this reaction was 0.11/(450/74)××100%=1.8%, i.e. an efficiency that is unacceptable for application on an industrial scale. Moreover, the known process appears to be unsuitable for obtaining higher DS values.

Carboxymethylation is a known process for the derivation of mono-, oligo- and polysaccharides, the primary and/or secondary alcohol groups of which are etherified with carboxymethyl groups. The derivatives thus obtained are (poly)-carboxylates, which find use in a great many applications, especially in detergent formulations, in the paper industry and in oil winning.

A further advantage of carboxymethylation is that the process can be carried out in a simple manner. The loss of chemicals is small and the products are biodegradable.

Known examples of carboxymethylated products are carboxymethyl cellulose (CMC) and carboxymethyl sucrose (CMSU).

The former product finds application in detergent compositions as an anti-redeposition agent and as a cobuilder to prevent calcium carbonate scale formation which occurs during the washing of laundry (also referred to as incrustation). According to U.S. Pat. No. 3,634,932, carboxymethylated sucrose is useful as a sequestering agent and also as a detergency builder for organic water-soluble synthetic detergents.

Though both products, CMSU and CMC, are biodegradable and therefore highly attractive to replace the well-established group of builders, such as organic phosphonates, nitrilotriacetate, inorganic triphosphate, and zeolites, or the group of cobuilders, such as polyacrylate, copolymers of acrylate and maleate, and polystyrene sulphonate, the properties of both CMC and CMSU detract from the performance in several respects.

A disadvantage of CMC is its relatively high viscosity, which allows only a limited amount to be incorporated in detergent compositions. CMSU, on the contrary, is readily soluble in water. Moreover, it has very good sequestering properties. However, it possesses no or hardly any crystallization inhibiting properties.

Consequently, there is a need for a biodegradable inhibitor selected from the group of carboxymethylated mono-, oligo- and polysaccharides which lacks the above-mentioned drawbacks.

Accordingly, the invention provides carboxymethyl inulin having a degree of substitution (DS) ranging from 0.15 to 2.5, preferably from 0.5 to 1.5.

Surprisingly, it was found that the addition of very small amounts (5 ppm–200 ppm) of CMI has—like CMSU—no or hardly any viscosity-increasing effect but—unlike CMSU—influences the crystallization rate and the crystal morphology of the precipitated calcium carbonate to a considerable extent.

It should be added that WO-A-91/17189 discloses that the oxidation product of inulin, a polycarboxysaccharide, possesses excellent calcium complexing properties. As it is readily soluble in water with no or hardly any viscosity increasing effect, it would appear to be a perfect candidate to take the place of the known non-biodegradable and/or viscous inhibitors of the crystallization of calcium carbonate in detergent compositions. Despite this, it was found by the inventors of the present application that crystal growth inhibition by the use of polycarboxyinulin was rather minimal.

The invention further relates to a process of preparing CMI having a DS ranging from 0.15 to 2.5, leading to much higher yields and efficiencies than may be obtained with the known process disclosed by Chien et al.

Said process is characterized in that in the known process where inulin is reacted at elevated temperature with an aqueous alkaline solution of monochloroacetic acid, followed by working up the reaction mixture according to a method known in the chemical art, the concentration of the inulin in the reaction medium is at least 100 g/l. Best results have been obtained with a concentration of at least 200 g/l.

A further improvement of said process is characterized in that the working up of the reaction mixture consists in precipitating the reaction mixture at the end of the reaction with a suitable solvent, such as absolute methanol.

Optimum results have been obtained with a process characterized in that water and the amount of aqueous alkali needed for the conversion with monochloroacetic acid are mixed to a kneadable paste, which after blending with monochloroacetic acid is heated to a temperature between 40° and 120° C.

The desired degree of substitution (DS) may be obtained by varying the molar ratio MCA-inulin between 0.5:1

The inulin considered within the scope of the present invention is an oligosaccharide consisting of (2-1)-linked β-D-fructofuranosyl residues with an α-D-glucopyranosyl unit at the reducing end. This fructan can be found as a reserve polysaccharide in various plants such as chicory, Jerusalem artichoke and dahlia. Inulin is a mixture of oligomers with different degrees of polymerization (DP). The average DP varies from 5 to 25, depending on the plant origin. Processes are known to remove most of the lower molecular weight inulin so as to arrive at materials of average DP of e.g. 30. In actual practice preference is given to an inulin having an average DP ranging from about 10 to about 30.

During the carboxymethylation reaction in aqueous medium there is a competition between the carboxymethylation and the hydrolysis of monochloroacetic acid (MCA) into glycolate. The extent to which the carboxymethylation is favoured can be expressed by the MCA efficiency (selectivity of the reaction towards carboxymethylated product). The MCA efficiency was higher at lower molar ratio of MCA to inulin.

A further object of the invention is the use of carboxymethyl inulin (CMI) having a DS of 0.15 to 2.5, preferably of 0.5 to 1.5 as inhibitor of the crystallization of calcium carbonate.

Surprisingly, it was found that the addition of already small amounts (5 ppm–200 ppm) of CMI, unlike CMSU, depresses the rate of crystallization of calcium carbonate and influences the crystal morphology of the precipitated calcium carbonate to a considerable extent. Said inhibiting effect depends on the DS of the CMI used. The higher the DS, the longer the induction period observed.

Without wishing to be bound by theory, it is believed that said crystallization-inhibiting effect is exerted through adsorption on the crystal surfaces. In polycarboxylates, such as CMI, this adsorption is effectuated by the anionic carboxylate groups. PMAA, a polycarboxylate which is currently used as an effective inhibitor, showed long induction periods, even at a very low concentration (10 ppm).

3

The influence of the addition of a minor amount of additive on the precipitation kinetics of calcium carbonate was examined as follows. First, supersaturated calcium carbonate solutions were prepared with or without an additive. The additives to be tested were added at two concentrations (200 ppm and 10 ppm). The experiments were carried out at pH=10. Carboxymethyl inulin (CMI) with different DS (0.36, 0.68, and 1.05) and average DP (10 and 30) values were tested and compared with the blank experiment. CMC and CMSU were tested as well. The effects were also compared with those of a known carboxylate inhibitor (PMAA). The decrease in supersaturation by spontaneous nucleation and subsequent growth was followed by monitoring the response of a Ca-selective electrode. At the beginning of the precipitation process, progressive nucleation occurs and the surface available for crystal growth is very small. At this time the decrease in the concentration of free Ca-ions is not measureable. The period in which the concentration of free Ca-ions remains practically constant is called induction time ($t_{ind}$). After the induction time, the crystal surface available for crystal growth becomes sufficiently high to cause a measurable decrease in the concentration of free Ca-ions. This decrease continues until an equilibrium is reached or until the growth rate becomes too low to notice any further changes in the concentration of free Ca-ions, as often happens in the presence of an effective growth inhibitor. In the blank experiment, no induction time was observed because of the high nucleation and growth rate at the high initial supersaturation. The concentration of free Ca-ions, which was initially $1.81 \times 10^{-3}$M, decreased to the equilibrium concentration $C_{eq}=4.90 \times 10^{-4}$M. In the cases where an inhibitor was added, an induction period was observed. This can be explained by inhibition of crystal growth, which influences $t_{ind}$. Because of the reduced growth rate, the equilibrium concentration of free Ca-ions was not reached within the time scale of the experiment. At the end of the experiment, an apparent equilibrium concentration, $C_e$, which is higher than the equilibrium concentration ($C_{eq}$), was obtained.

The invention will now be illustrated with the following examples.

EXAMPLE 1

In a 100-ml round-bottom vessel 3.4 g inulin, DP 30, (20 mmol monomeric units) was dissolved in 25 ml water. To this solution 6.4 g NaOH (160 mmol) and 7.5 g monochloroacetic acid (MCA) (80 mmol) were added, which corresponds to a molar ratio MCA/inulin of 4.

The solution was heated to the reaction temperature of 95° C. and stirred magnetically for 5 hours. After cooling, the reaction mixture was concentrated under reduced pressure to a volume of about 10 ml. The resulting mixture was poured into 100 ml well-stirred absolute MeOH. The sodium salt of carboxymethyl inulin (CMI) precipitated as a white solid. Glycolate, formed by hydrolysis of MCA, remained in solution. The residue was filtered off, washed with absolute MeOH and dried under reduced pressure. Finally, NaCl and traces of glycolate and MeOH were removed by membrane filtration at a pressure of 20 bar. The solution was freeze-dried to yield pure (>95%) CMI. The product was slightly brown coloured.

The experiment was repeated with three different MCA/inulin ratios of 0.5, 1, and 2.

The degree of substitution, DS, was determined by titration of the carboxylic acid groups, by HPLC analysis and by $^{13}$C NMR spectroscopy. The results are given in Table I.

TABLE I

| Molar ratio | DS as determined by | | | *MCA |
| MCA-inulin | titration | HPLC | $^{13}$C NMR | efficiency |
| --- | --- | --- | --- | --- |
| 0.5 | 0.22 | 0.21 | 0.21 | 0.42 |
| 1 | 0.40 | 0.36 | 0.33 | 0.36 |
| 2 | 0.66 | 0.70 | 0.67 | 0.34 |
| 4 | 1.05 | 0.99 | 1.10 | 0.25 |

*MCA efficiency is calculated as (average DS/molar ratio MCA/inulin) HPLC analysis showed that of the monosaccharide units 24.1% was unsubtituted, 52.5% monosubstituted, and 23.4% disubstituted.

EXAMPLE 2

Example 1 was repeated for molar ratios MCA-inulin of 2/1 and 1/1, with the proviso that the reaction was carried out at a temperature of 75° C. and with different water contents. The results are given in Table II.

TABLE II

| Volume water (ml) | Molar ratio MCA/inulin | selectivity (%) | (DS) of CMI |
| --- | --- | --- | --- |
| 25 | 2:1 | 39 | 0.65 |
| 10 | 2:1 | 52 | 0.90 |
| 5 | 1:1 | 78 | 0.65 |

In all cases the conversion of MCA was 85%.

The results in Table II clearly show that the selectivity of the reaction increases dramatically with decreasing water content of the reaction mixture.

EXAMPLE 3

410 g inulin (2.5 moles) was mixed with water until a kneadable paste was formed. A 50% NaOH solution (1 mole) was added and the mixture was kneaded for 1 h Thereupon, the sodium salt of MCA (117 g, 1 mole) was mixed thoroughly with the paste. The mixture was then heated at 70° C. for 3 hours. A syrupy product was obtained. The resulting mixture-was poured into well-stirred absolute MeOH, from which the sodium salt-of carboxymethyl inulin (CMI) precipitated as a white solid. The residue was filtered off, washed with absolute MeOH and dried under reduced pressure. Finally, NaCl and traces of glycolate and MeOH were removed by membrane filtration at a pressure of 20 bar. This procedure permitted the preparation of a large amount of CMI, using a small reactor volume.

HPLC-analysis showed that the reaction product was CMI with a DS of 0.24. The conversion of MCA was 73% and the selectivity towards CMI was 81%.

EXAMPLE 4

In the following examples the inhibiting activities of CMI are compared with those of a commercial low viscosity grade of CMC (AKUCEL LZ 253, ex Akzo Nobel) and CMSU having varying degrees of substitution (DS), and with PMAA (copolymer of maleate and acrylate).

TABLE III

| inhibitor | DS | 10 ppm additive | | 200 ppm additive | |
|---|---|---|---|---|---|
| | | $t_{ind(s)}$ | $c_s(10^{-4}M)$ | $t_{ind(s)}$ | $c_s(10^{-4}M)$ |
| CMI | 1.05 | 270 | 9.55 | 525 | 10.30 |
| CMI | 0.68 | 150 | 9.33 | 285 | 10.00 |
| CMI | 0.36 | 10 | 6.30 | 50 | 9.40 |
| CMI' | 0.68 | 135 | 8.33 | 200 | 10.00 |
| CMC | 0.57 | — | — | 30 | 11.30 |
| CMSU | 1.23 | 0 | 4.90 | 0 | 4.93 |
| CMSU | 2.00 | 0 | 4.93 | 30 | 4.90 |
| PMAA | | 760 | 11.53 | | |

In Table III CMI has a DP=30, whereas the DP of CMI' was about 10. The pH of the tested solutions was about 10.

The results mentioned in the above table clearly show the influence of the inhibiting activities of CMI as compared with CMC and CMSU. The effect increases with the degree of substitution.

A great advantage of CMI over CMC is that aqueous solutions of CMI display, contrary to those of CMC, a very low viscosity as is shown in Table IV. For the determination of said viscosity the samples were subjected to a shear stress from 0.06 to 700 Pa in a stress viscosity test, wherein use was made of a Bohlin CS Rheometer.

Two grades of CMC were used, viz. AKUCEL LZ 253, having a DS of 0.57, and AKUCEL LZ 293, having a DS of 0.95.

TABLE IV

| inhibitor | DS | concentration solution wt. % | viscosity (Pa · s) | Pseudo Plasticity |
|---|---|---|---|---|
| CMI' | 0.65 | 40 | 0.012 | − |
| CMI | 0.65 | 40 | 0.016 | − |
| CMC | 0.95 | 2 | 0.57 | + |
| CMC | 0.95 | 5 | 26 | + |
| CMC | 0.95 | 10 | 400 | + |
| CMC | 0.57 | 2 | 0.40 | + |
| CMC | 0.57 | 5 | 100 | + |
| CMC | 0.57 | 7 | −1500 | + |

The results mentioned in Table IV clearly show that the viscosity, measured at low shear stress (<1 Pa), of aqueous CMI solutions is independent of the shear stress.

We claim:

1. Carboxymethyl inulin having a degree of substitution (DS) ranging from 0.15 to 2.5.

2. Carboxymethyl inulin according to claim 1 wherein the degree of substitution (DS) ranges from 0.5 to 1.5.

3. A process for the preparation of carboxymethyl inulin according to claim 1 which comprises reacting inulin at elevated temperatures with an aqueous alkaline solution of monochloroacetic acid, wherein the concentration of the inulin in the reaction medium is at least 100 g/l.

4. The process of claim 3 wherein the concentration of the inulin is at least 200 g/l.

5. A process of claim 3 which further comprises adding a suitable solvent to the reaction mixture.

6. The process of claim 3 wherein water and the amount of aqueous alkali needed for the conversion of monochloroacetic acid are mixed to a kneadable paste, which after blending with monochloroacetic acid is heated to a temperature between 40° and 120° C.

7. A method for inhibiting the crystallization of calcium carbonate from a solution which comprises adding to the solution an effective amount of a carboxymethyl inulin having a degree of substitution (DS) ranging from 0.15 to 2.5.

8. The method of claim 7 wherein the carboxymethyl inulin has a degree of substitution of from 0.5 to 1.5.

9. The process of claim 5 wherein said solvent is absolute methanol.

10. The method of claim 7 wherein the solution contains a detergent.

11. The method of claim 7 wherein the carboxymethyl inulin is added in an amount from about 5 ppm to about 200 ppm.

12. A process for the preparation of carboxymethyl inulin which comprises:

reacting inulin at an elevated temperature with an aqueous alkaline solution of monochloroacetic acid to form a reaction mixture, the concentration of the inulin in the reaction mixture being at least 100 g/l; and precipitating carboxymethyl inulin having a degree of substitution (DS) ranging from 0.15 to 2.5 by adding a suitable solvent to the reaction mixture.

13. The process of claim 12 wherein the suitable solvent is methanol.

* * * * *